(12) United States Patent
Fukuda

(10) Patent No.: US 8,179,548 B2
(45) Date of Patent: May 15, 2012

(54) APPARATUS AND METHOD FOR DATA PROCESSING

(75) Inventor: Michitaka Fukuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1318 days.

(21) Appl. No.: 11/757,029

(22) Filed: Jun. 1, 2007

(65) Prior Publication Data
US 2007/0279703 A1  Dec. 6, 2007

(30) Foreign Application Priority Data

Jun. 6, 2006  (JP) .................................. 2006-157014
Feb. 28, 2007  (JP) .................................. 2007-048569

(51) Int. Cl.
*H04N 1/40* (2006.01)
(52) U.S. Cl. .......... 358/1.15; 358/448; 358/1.1; 358/1.9
(58) Field of Classification Search .................. 358/1.6, 358/1.15, 1.1, 448
See application file for complete search history.

(56) References Cited

FOREIGN PATENT DOCUMENTS

| CN | 1409549 A | 4/2003 |
|---|---|---|
| CN | 1452745 A | 10/2003 |
| CN | 1747518 | * 3/2006 |
| CN | 1747518 A | 3/2006 |
| JP | 10-84484 | 3/1998 |
| JP | 11-232468 | 8/1999 |
| JP | 2001-186361 | 7/2001 |
| JP | 2001-218006 | 8/2001 |
| JP | 3244138 | 10/2001 |
| JP | 2001-358946 | 12/2001 |
| JP | 3257895 | 12/2001 |
| JP | 2002-10086 | 1/2002 |
| JP | 3332443 | 7/2002 |
| JP | 2002-247375 | 8/2002 |
| JP | 2003-37739 | 2/2003 |
| JP | 2003-101799 | 4/2003 |
| JP | 3486427 | 10/2003 |
| JP | 2003-348355 | 12/2003 |
| JP | 2004-88425 | 3/2004 |
| JP | 2004-96695 | 3/2004 |
| JP | 2004-133443 | 4/2004 |
| JP | 2004-165760 | 6/2004 |
| JP | 2004-179692 | 6/2004 |
| JP | 2004-254131 | 9/2004 |
| JP | 2005-117290 | 4/2005 |
| JP | 2005-218124 | 8/2005 |
| JP | 2006-87005 | 3/2006 |
| WO | WO0175620 | * 10/2001 |

OTHER PUBLICATIONS

Office Action mailed Mar. 27, 2009, in Chinese Patent Application No. 2007101085793.
Office Action issued Nov. 22, 2011 in Japanese Patent Application No. 2007-048569.

* cited by examiner

*Primary Examiner* — King Poon
*Assistant Examiner* — Iriana Cruz
(74) *Attorney, Agent, or Firm* — Oblon, Spivak, McClelland, Maier & Neustadt, L.L.P.

(57) ABSTRACT

When inputting image data, a plurality of kinds of processed image data may be generated from the image data. When outputting image data, a plurality of kinds of output image data may be generated from the image data.

9 Claims, 5 Drawing Sheets

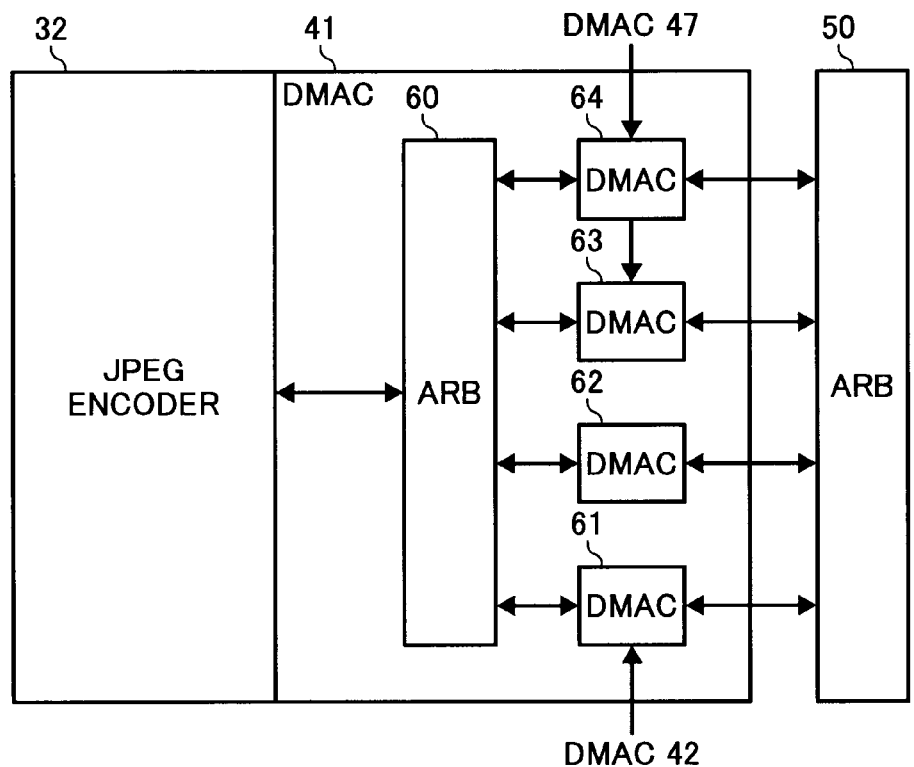
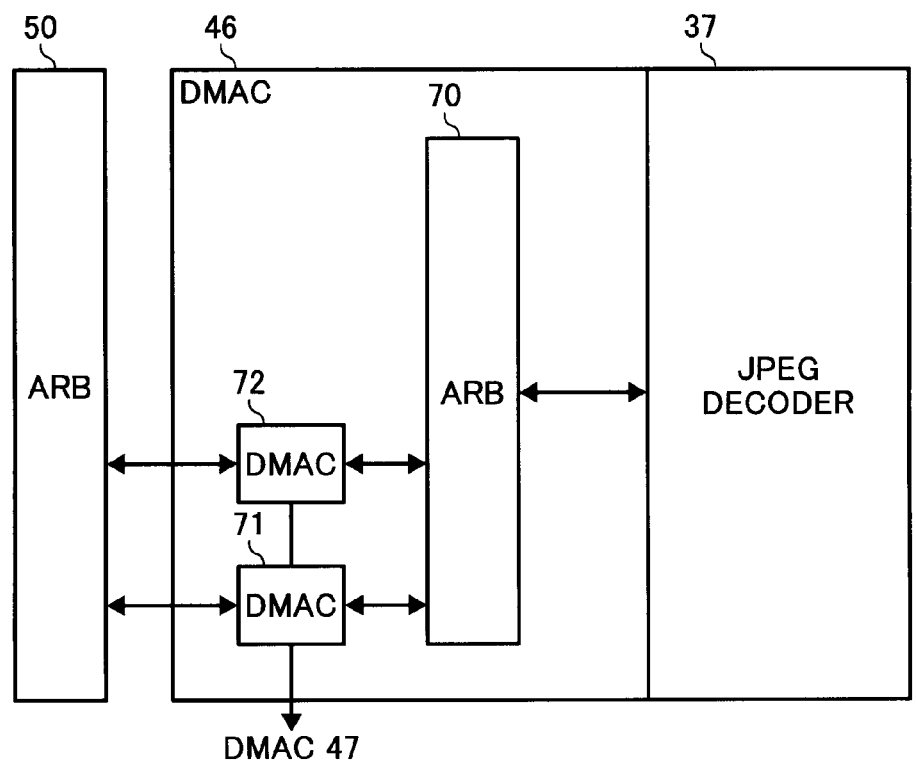

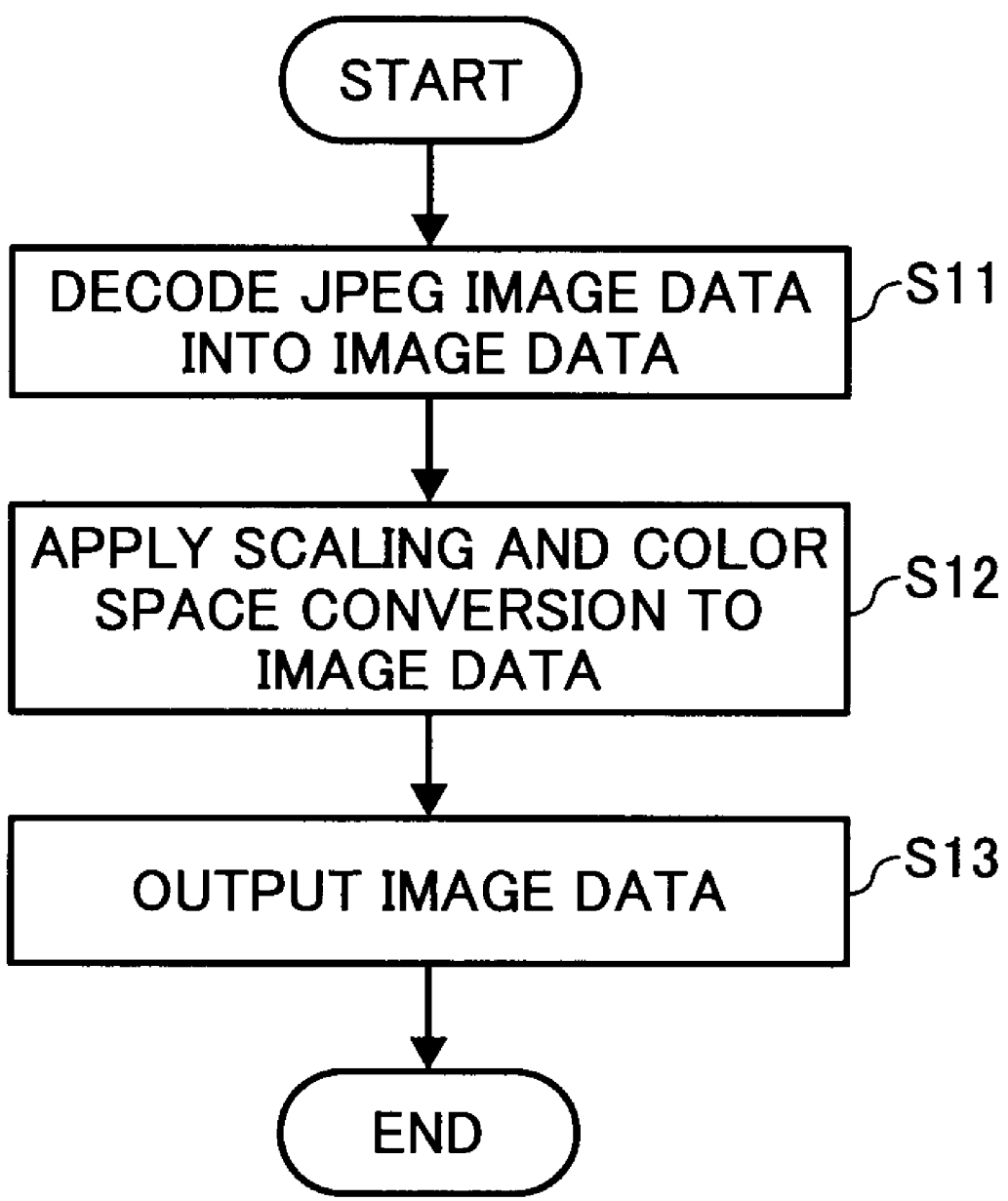

APPARATUS AND METHOD FOR DATA PROCESSING

CROSS-REFERENCE TO RELATED APPLICATIONS

This patent application is based on and claims priority under 35 U.S.C. §119 to Japanese patent application Nos. 2006-157014 filed on Jun. 6, 2006, and 2007-048569 filed on Feb. 28, 2007, in the Japanese Patent Office, the entire contents of which are hereby incorporated by reference.

FIELD OF THE INVENTION

Example embodiments of the present invention relate generally to an apparatus and method for processing image data, and more specifically to an apparatus and method for processing image data of a plurality of kinds.

DESCRIPTION OF THE RELATED ART

Recently, an image processing apparatus is provided with a plurality of functions including the function of scanning, copying, faxing, printing, storing, and transferring data via a network such that it may be referred to as a multifunctional apparatus. When inputting image data, for example, through scanning, the multifunctional apparatus usually stores the image data in one default format previously determined. Upon receiving a user instruction, the multifunctional apparatus converts the default format of the image data to a format specified by the user instruction. However, when converting the default format to the specified format, image quality may be lowered. For example, when the image data is stored in the CMYK format, and when the user instruction requests the multifunctional apparatus to send the image data via the network, the CMYK image data needs to be converted to the RGB image data. Due to this conversion, the resultant image may be degraded.

In order to solve the above-described problem, the multifunctional product may generate a plurality of kinds of image data, and select one of the plurality of kinds of image data that matches the user instruction. However, this may require the multifunctional product to have more than one memory as more than one processing needs to be performed. Further, this may increase the processing speed of the multifunctional apparatus.

SUMMARY

Example embodiments of the present invention include an apparatus and method for processing image data of a plurality of kinds.

In one example, an image processing apparatus includes a scanner, an image processor, and a memory. The scanner scans an original into image data. The image processor inputs the image data as input image data, and applies image processing to the input image data to generate a plurality of kinds of processed image data. The memory stores the plurality of kinds of processed image data.

The image processor may include: a first image processing circuit configured to apply first image processing to the input image data to generate first processed image data; a first memory controller coupled to the first image processing circuit and configured to output a first storing request for storing the first processed image data in the memory; a second image processing circuit configured to apply second image processing to the input image data to generate second processed image data; a second memory controller coupled to the second image processing circuit and configured to output a second storing request for storing the second processed image data in the memory; and a first coordination circuit coupled to the first memory controller and the second memory controller and configured to manage the first storing request and the second storing request to cause the memory to store the first processed image data and the second processed image data in an order previously determined when the first storing request and the second storing request are received substantially at the same time.

The image processor may further include: a third image processing circuit configured to apply third image processing to the first processed image data stored in the memory to generate output image data; and a third memory controller coupled to the third image processing circuit and configured to output a third storing request for storing the output image data in the memory. The first coordination circuit may further manage the third storing request in addition to the first storing request and the second storing request to cause the memory to store at least two of the first processed image data, the second processed image data, and the output image data in an order previously determined, when the at least two of the first storing request, the second storing request, and the third storing request are output substantially at the same time.

In another example, an image processing apparatus includes an image processor, a first output device, and a second output device. The image processor inputs image data as input image data, and applies image processing to the input image data to generate at least one of a plurality of kinds of output image data upon receiving a user instruction. The plurality of kinds of output image data may include first output image data and second output image data. The first output device may output the first output image data through a network according to the user instruction. The second output device may output the second output image data to an image forming device according to the user instruction.

In addition to the above-described examples, the present invention may be implemented in various other ways, for example, as a method of image processing, a computer program product storing a computer program that causes a general-purpose computer to operate as any one of the image processing apparatuses described above or below.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3 is a schematic block diagram illustrating an example structure of a direct memory access controller connected to an encoder shown in FIG. 2;

FIG. 4 is a schematic block diagram illustrating an example structure of a direct memory access controller connected to a decoder shown in FIG. 2;

FIG. 7 is a flowchart illustrating operation of outputting image data stored in the multifunctional apparatus shown in FIG. 1 according to an example embodiment of the present invention.

DETAILED DESCRIPTION OF THE INVENTION

Figure 1:
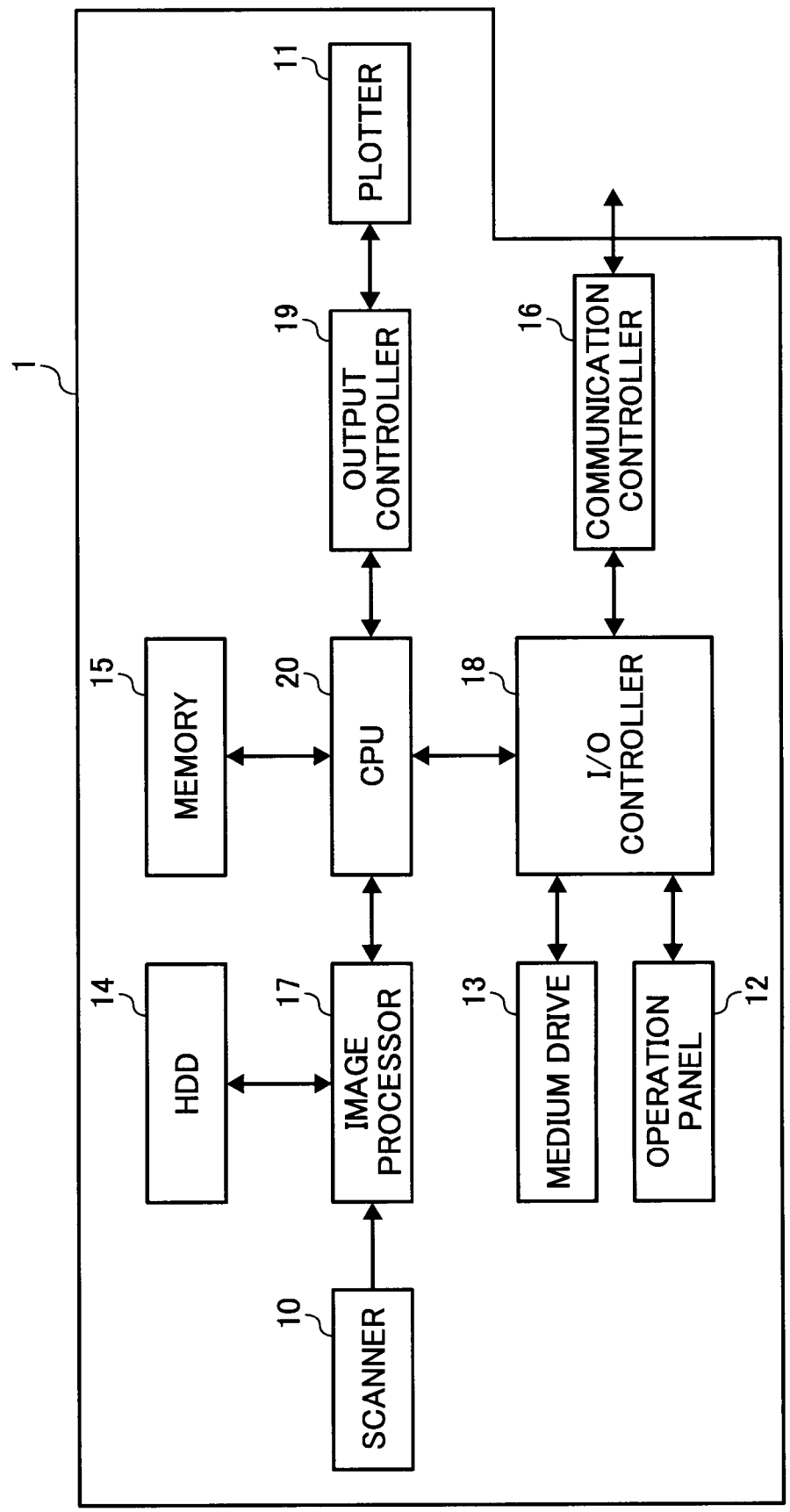
FIG. 1 is a schematic block diagram illustrating a hardware structure of a multifunctional apparatus according to an example embodiment of the present invention.

In describing the example embodiments illustrated in the drawings, specific terminology is employed for clarity. However, the disclosure of this patent specification is not intended to be limited to the specific terminology selected and it is to be understood that each specific element includes all technical equivalents that operate in a similar manner. For example, the singular forms "a", "an" and "the" are intended to include the plural forms as well, unless the context clearly indicates otherwise.

Referring now to the drawings, wherein like reference numerals designate identical or corresponding parts throughout the several views, FIG. 1 illustrates a multifunctional apparatus (MFP) 1 according to an example embodiment of the present invention. The MFP 1 is capable of performing a plurality of functions including the functions of scanning, copying, faxing, printing, storing, and transferring data via a network.

The MFP 1 includes a scanner 10, a plotter 11, an operation panel 12, a medium drive 13, a hard disk drive (HDD) 14, a memory 15, a communication controller 16, an image processor 17, an input/output (I/O) controller 18, an output controller 19, and a central processing unit (CPU) 20.

The scanner 10 may be implemented by any desired image reading device, which may include an optical writing device, an imaging sensor, an analog/digital converter, etc. For example, the optical writing device irradiates light to an original to generate an optical image. The imaging sensor, such as a charged coupled device (CCD), converts the optical image into an image signal. The analog/digital converter converts the image signal into image data for further processing.

The plotter 11 may be implemented by a printer engine capable of controlling a printer, such as a laser printer or an ink-jet printer, to form a printed image on a recording sheet according to the image data output by the scanner 10.

The operation panel 12 may be implemented by any desired user interface, which allows the MFP 1 to communicate with a user. The operation panel 12 may include an input device that allows the user to input information, such as a keyboard, button, key, etc. The operation panel 12 may further include an output device that allows the MFP 1 to output information to the user, such as a liquid crystal display (LCD), speaker, etc. In one example, the operation panel 12 may be implemented by a touch-panel screen having the functions of input device and output device.

The medium drive 13 may be implemented by any desired device capable of reading or writing data from or onto a recording medium. Examples of the recording medium may include a secure digital (SD) card, compact flash card, memory card such as a memory stick, etc.

The HDD 14 may be implemented by any desired storage device capable of storing various data, such as the image data output by the scanner 10, which may be processed or unprocessed by the image processor 17.

The memory 15 may store various data, including the image data output by the scanner 10, which may be processed or unprocessed by the image processor 17, or various programs to be used by the CPU 20.

The communication controller 16 allows the MFP 1 to communicate with the user via a network, such as a communication line, a local area network (LAN), or the Internet.

The image processor 17 may apply various image processing to image data to generate processed image data. The image data may be output by the scanner 10, or read out from the HDD 14 or the recording medium. Alternatively, the image data may be obtained from the network. Examples of image processing include color space conversion, resizing of the image data that may be referred to as scaling, resolution conversion, encoding such as JPEG encoding, or decoding such as JPEG decoding.

In one example, when storing the image data output by the scanner 10 in the HDD 14, the image processor 17 may apply color space conversion to the image data output by the scanner 10 to generate RGB image data. The image processor 17 may further apply JPEG encoding to the RGB image data before storing the RGB image data in the HDD 14.

In another example, when printing the image data stored in the HDD 14 using the plotter 11, the image processor 17 may decode the JPEG encoded RGB image data read out from the HDD 14, apply color conversion to convert the RGB image data into CMYK image data, and send the CMYK image data to the memory 15 under control of the CPU 20. At this time, the image processor 17 may further apply gradation processing to the CMYK image data.

In another example, when transferring the image data stored in the HDD 14 through the network or when storing the image data in the recording medium using the medium drive 13, the image processor 17 may decode the JPEG encoded RGB image data read out from the HDD 14, apply scaling or resolution conversion to the RGB image data, apply JPEG encoding to the RGB image data, and send the encoded RGB image data to the memory 15 under control of the CPU 20. At this time, the image processor 17 may further apply color conversion to convert the RGB image data to the CMYK image data.

The I/O controller 18 controls data, which may be transferred between the CPU 20 and any one of the operation panel 12, medium drive 13, and communication controller 16. For example, the I/O controller 18 may read out the image data for transfer, such as the encoded RGB image data generated by the image processor 17, from the memory 15 through the CPU 20, and further output the encoded RGB image data to the network through the communication controller 16. In another example, the I/O controller 18 may read out the image data for storage, such as the encoded RGB image data generated by the image processor 17, from the memory 15 through the CPU 20, and further write the encoded RGB image data onto the recording medium using the medium drive 13. In another example, the I/O controller 18 may read out the image data for display, such as the RGB image data generated by the image processor 17, from the memory 15 through the CPU 20, and further display the RGB image data on the display device of the operation panel 12.

The output controller 19 controls printing operation performed by the plotter 11. For example, the output controller 19 may read out the image data for printing, such as the CMYK image data generated by the image processor 17, from the memory 15 through the CPU 20. The output controller 19 may apply PWM (pulse-width modulation) processing to the CMYK image data, and output the CMYK image data to the plotter 11.

The CPU 20 controls operation of the MFP 1, including image processing operation performed by the image processor 17, according to an image processing control program stored in the memory 15. In this example, the image processing control program may be obtained from the HDD 14, the medium drive 13, or the network through the communication controller 16.

Figure 2:
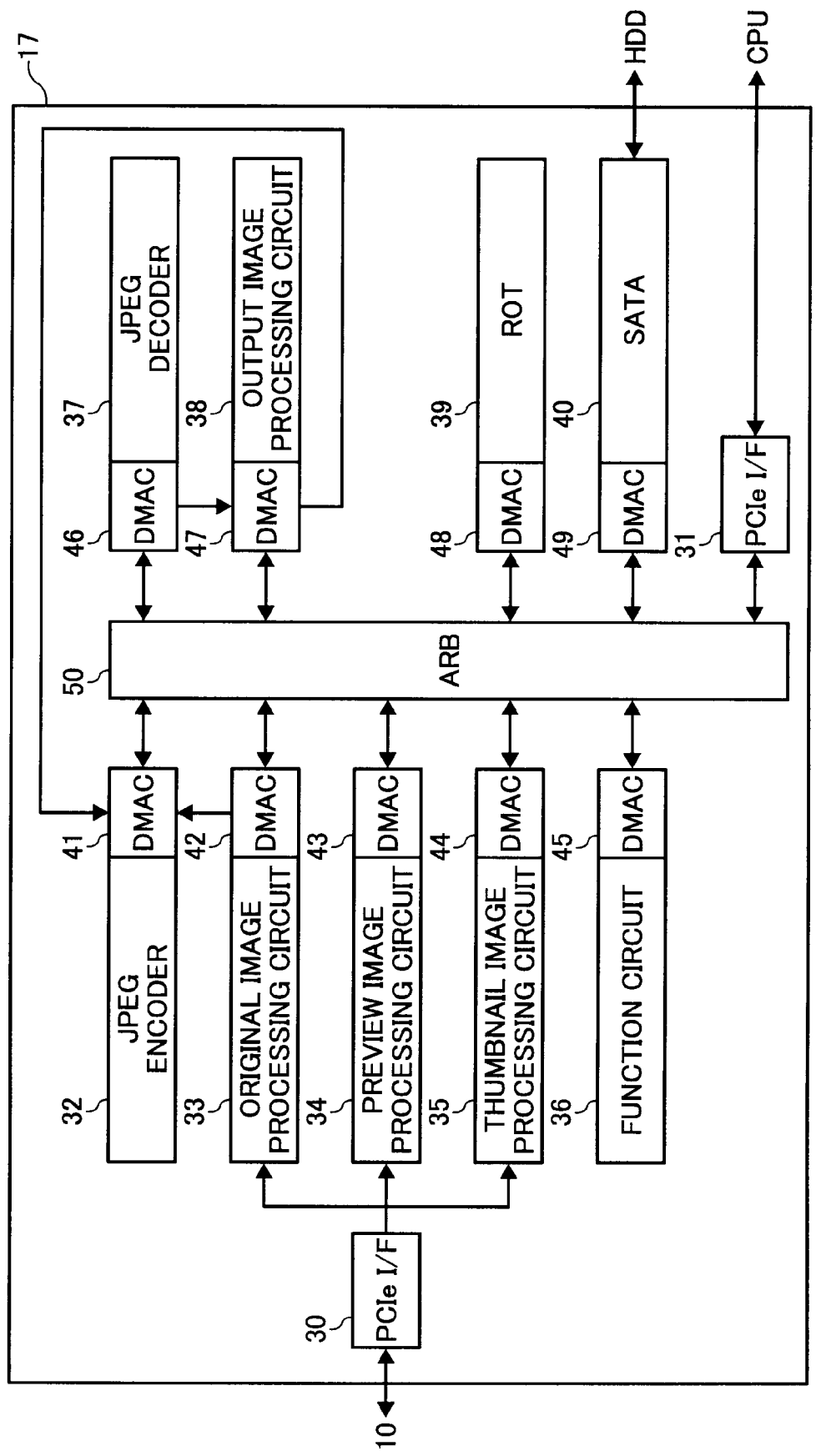
FIG. 2 is a schematic block diagram illustrating an example structure of an image processor shown in FIG. 1.

Referring now to FIG. 2, an example structure of the image processor 17 shown in FIG. 1 is explained. The image processor 17 includes a first PCIe interface (I/F) 30, a second PCIe I/F 31, a JPEG encoder 32, an original image processing circuit 33, a preview image processing circuit 34, a thumbnail image processing circuit 35, a function circuit 36, a JPEG decoder 37, an output image processing circuit 38, a rotator (ROT) 39, a serial advanced technology attachment interface (SATA) 40, direct access memory controllers (DMAC) 41 to 49, and an arbiter (ARB) 50.

The first PCIe I/F 30 and the second PCIe I/F 31 may be each implemented by a serial interface such as a PCI express interface, which allows data transfer between the image processor 17 and the outside system. For example, the first PCIe I/F 30 may control data transfer between the image processor 17 and the scanner 10. The second PCIe I/F 31 may control data transfer between the image processor 17 and the memory 15 through the CPU 20. The JPEG encoder 32 applies JPEG encoding to image data to generate encoded image data. The JPEG decoder 37 applies JPEG decoding to encoded image data to generate decoded image data.

The image processing circuits 33, 34, and 35 each apply image processing to image data, for example, when the image data is read by the scanner 10. As described below, the original image processing circuit 33 may start processing upon inputting of the image data. The preview image processing circuit 34 may start processing upon completion of processing performed by the original image processing circuit 33. The thumbnail image processing circuit 35 may start processing upon completion of processing performed by the preview image processing circuit 34.

Specifically, in this example, the original image processing circuit 33 applies color space conversion to the image data to generate original-size image data having an original image size. The preview image processing circuit 34 applies color space conversion and scaling or resolution conversion to the image data to generate preview image data having an image size suitable for preview, which is smaller than the original image size. The thumbnail image processing circuit 35 applies color space conversion and scaling or resolution conversion to the image data to generate thumbnail image data having an image size suitable for thumbnail, which is smaller than the preview image size. With the image processing circuits 33, 34, and 35, a plurality of kinds of image data including the original-size image data, preview image data, and thumbnail image data may be generated when the reading operation is performed by the scanner 10. For the descriptive purpose, the image data generated by the image processing circuits 33, 34, and 35 may be collectively referred to as the processed image data. Further, any one of the original-size image data, preview image data, and thumbnail image data may be encoded.

The output image processing circuit 38 applies various image processing to image data, including color space conversion, scaling, resolution conversion, and/or gradation processing, for example, before the image data is printed or sent to the network. In one example, the output image processing circuit 38 applies color space conversion to the RGB image data read out from the HDD 14 to generate CMYK image data ("the print image data") for printing. In another example, the output image processing circuit 38 applies scaling or resolution conversion to the RGB image data read out from the HDD 14 to generate the image data ("the transferred data") having a smaller file size for electronic distribution. For the descriptive purpose, the image data generated by the output image processing circuit 38, such as the print image data and the transferred data, may be collectively referred to as the output image data.

The function circuit 36 may correspond to any circuit, which may be provided in the image processor 17 to apply processing other than image processing performed by any one of the image processing circuits 33, 34, 35, and 38. For example, the function circuit 36 may function as an encryption circuit applying encryption to image data.

The ROT 39 rotates the image data. The SATA 40 may function as a HDD controller, which controls writing or reading of the image data onto or from the HDD 14. The DMAC 41 to 49 each function as a controller, which controls data transfer among two or more components in the image processor 17.

The ARB 50 manages a request for reading or writing data from or onto the memory 15 through the second PCIe I/F 31 and the CPU 20, which may be generated by any one of the DMACs 41 to 47. For example, as described below referring to FIGS. 2 and 3, the ARB 50 may manage a request for storing the processed image data, which may be generated by either one of the original image processing circuit 33, preview image processing circuit 34, and thumbnail image processing circuit 35 such that only one request is granted at a time.

Referring to FIGS. 2 and 3, operation of generating the original-size image data, preview image data, and thumbnail image data is explained according to an example embodiment of the present invention. In this example, the scanner 10 reads an original into image data, one page by one page, to input image data corresponding to one page of the original to the image processor 17 through the first PCIe I/F 30. The image processor 17 performs the following operation of generating a plurality of kinds of image data every time it receives the input image data.

When the one-page image data, i.e., the input image data is received by the PCIe I/F 30, the PCIe I/F 30 respectively outputs the input image data to the original image processing circuit 33, the preview image processing circuit 34, and the thumbnail image processing circuit 35.

In order to generate the original-size image data, the original image processing circuit 33 applies color space conversion to the input image data such that the original-size image data has the Adobe RGB format. In this example, the original-size image data has the resolution of 600 dpi. At this time, no subsampling is applied such that the brightness component Y and the color difference components Cb and Cr of the original-size image data have the ratio 1:1:1.

In order to generate the preview image data, the preview image processing circuit 34 applies color space conversion to the input image data such that the preview image data has the sRGB format. The preview image processing circuit 34 further applies resolution conversion such that the preview image data has the resolution of 150 dpi. Further, the preview image processing circuit 34 applies subsampling such that the brightness component Y and the color difference components Cb and Cr of the preview image data have the ratio 4:2:2.

In order to generate the thumbnail image data, the thumbnail image processing circuit 35 applies color space conversion to the input image data such that the thumbnail image data has the sRGB format. Further, the thumbnail image processing circuit 35 applies resolution conversion such that the thumbnail image data has the resolution of 37.5 dpi. Further, the thumbnail image processing circuit 35 applies subsampling such that the brightness component Y and the color difference components Cb and Cr of the thumbnail image data have the ratio 4:2:2.

The original-size image data generated by the original image processing circuit 33 is sent to the JPEG encoder 32 through the DMACs 42 and 41 to be encoded by the JPEG encoder 32. The encoded original-size image data is sent to the CPU 20 through the DMAC 41, the ARB 50, and the second PCIe I/F 31, and further to the memory 15 to be temporarily stored. The CPU 20 reads out the encoded original-size image data from the memory 15, and sends the encoded original-size image data to the image processor 17. The encoded original-size image data, which is input through the second PCIe I/F 31, is sent to the HDD 14 through the ARB 50, DMAC 49, and SATA 40.

The preview image data generated by the preview image processing circuit 34 is sent to the JPEG encoder 32 through the DMAC 43, the ARB 50, and the DMAC 41 to be encoded by the JPEG encoder 32. In this example, the preview image data may be temporarily stored in an internal buffer until the original-size image data is encoded. The encoded preview image data is sent to the CPU 20 through the DMAC 41, the ARB 50, and the second PCIe I/F 31, and further to the memory 15 to be temporarily stored. The CPU 20 reads out the encoded preview image data from the memory 15, and sends the encoded preview image data to the image processor 17. The encoded preview image data, which is input through the second PCIe I/F 31, is sent to the HDD 14 through the ARB 50, DMAC 49, and SATA 40.

The thumbnail image data generated by the thumbnail image processing circuit 35 is sent to the JPEG encoder 32 through the DMAC 44, the ARB 50, and the DMAC 41 to be encoded by the JPEG encoder 32. In this example, the thumbnail image data may be temporarily stored in an internal buffer until the preview image data is encoded. The encoded thumbnail image data is sent to the CPU 20 through the DMAC 41, the ARB 50, and the second PCIe I/F 31, and further to the memory 15 to be temporarily stored. The CPU 20 reads out the encoded thumbnail image data from the memory 15, and sends the encoded thumbnail image data to the image processor 17. The encoded thumbnail image data, which is input through the second PCIe I/F 31, is sent to the HDD 14 through the ARB 50, DMAC 49, and SATA 40.

Alternatively, the thumbnail image data generated by the thumbnail image processing circuit 35 may be sent to the CPU 20 through the DMAC 44, the ARB 50, and the PCIe I/F 31, without being encoded by the JPEG encoder 32.

In this manner, the image processor 17 generates a plurality of kinds of processed image data from the one-page image data provided by the scanner 10 when the original is being read into the image data by the scanner 10. Further, the image processor 17 applies JPEG encoding to a plurality of kinds of image data generated from the one-page image data provided by the scanner 10 when the original is being read into the image data by the scanner 10.

More specifically, in this example, the time period it takes for the image processor 17 to generate and/or encode a plurality of kinds of image data for one page may be set equal to or less than a predetermined time period. The predetermined time period includes a reading time period in which the scanner 10 reads one page of the original and a waiting time period in which the scanner 10 waits before starting reading next page of the original. The waiting time period may be previously set as a time period in which paper jam detection or various setting may be performed.

In operation, the JPEG encoder 32 encodes the original-size image data generated by the original image processing circuit 33 during the reading time period in which the scanner 10 reads one page of the original. The JPEG encoder 32 sequentially encodes the preview image data and/or thumbnail image data during the waiting time period in which the scanner 10 waits before starting reading next page of the original.

Referring now to FIG. 3, an example structure of the DMAC 41, which controls inputting of image data to the JPEG encoder 32, is explained. The DMAC 41 includes an arbiter 60 and DMACs 61 to 64.

The DMAC 61 controls input of the original-size image data to the JPEG encoder 32, by sending a request for encoding the original-size image data to the ARB 60. When the ARB 60 determines to grant the request sent by the DAMC 61, the DAMC 61 outputs the original-size image data received from the original image processing circuit 33 through the DMAC 42 to the ARB 60. The ARB 60 inputs the original-size image data to the JPEG encoder 32, and outputs the encoded original-size image data received from the JPEG encoder 32 to the DMAC 61. The DMAC 61 outputs the encoded original-size image data to the ARB 50.

The DMAC 62 controls input of the preview image data to the JPEG encoder 32, by sending a request for encoding the preview image data to the ARB 60. When the ARB 60 determines to grant the request sent by the DAMC 62, the DAMC 62 outputs the preview image data received from the preview image processing circuit 34 through the DMAC 43 and the ARB 50 to the ARB 60. The ARB 60 inputs the preview image data to the JPEG encoder 32, and outputs the encoded preview image data received from the JPEG encoder 32 to the DMAC 62. The DMAC 62 outputs the encoded preview image data to the ARB 50.

The DMAC 63 controls input of the thumbnail image data to the JPEG encoder 32, by sending a request for encoding the thumbnail image data to the ARB 60. When the ARB 60 determines to grant the request sent by the DAMC 63, the DAMC 63 outputs the thumbnail image data received from the thumbnail image processing circuit 35 through the DMAC 44 and the ARB 50 to the ARB 60. The ARB 60 inputs the thumbnail image data to the JPEG encoder 32, and outputs the encoded thumbnail image data received from the JPEG encoder 32 to the DMAC 63. The DMAC 63 outputs the encoded thumbnail image data to the ARB 50.

The DMAC 64 controls input of the output image data to the JPEG encoder 32, by sending a request for encoding the output image data to the ARB 60. When the ARB 60 determines to grant the request sent by the DAMC 64, the DAMC 64 outputs the output image data received from the output image processing circuit 38 through the DMAC 47 and the ARB 50 to the ARB 60. The ARB 60 inputs the output image data to the JPEG encoder 32, and outputs the encoded output image data received from the JPEG encoder 32 to the DMAC 64. The DMAC 64 outputs the encoded output image data to the ARB 50.

The ARB 60 manages the requests sent by the DMACs 61 to 64 such that only one request is granted at a time. When more than one request is sent to the ARB 60 at substantially the same time, the ARB 60 determines to grant the requests sequentially in an order previously set. In this example, the order may correspond to the order of priority in using the JPEG encoder 32. Specifically, in this example, the ARB 60 grants the requests sequentially in the order of DMAC 61, DMAC 62, DMAC 63, and DMAC 64. The order of priority may be set before reading an original into image data by the scanner 10.

In an example operation of encoding the input image data generated by the scanner 10 before storing the input image data in the HDD 14, the ARB 60 may receive the request for encoding the original-size image data from the DMAC 61, the request for encoding the preview image data from the DMAC 62, and the request for encoding the thumbnail image data from the DMAC 63, substantially at the same time. According to the order of priority, the ARB 60 first grants the request for encoding the original-size image data from the DMAC 61 to cause the JPEG encoder 32 to encode the original-size image data, and sends the encoded original-size image data to the DMAC 61. When performing the operation requested by the DMAC 61, the ARB 60 does not grant any other request. When the operation requested by the DMAC 61 is completed, the ARB 60 grants the request for encoding the preview image data from the DMAC 62 to cause the JPEG encoder 32 to encode the preview image data, and sends the encoded preview image data to the DMAC 62. When performing the operation requested by the DMAC 62, the ARB 60 does not grant any other request. When the operation requested by the DMAC 62 is completed, the ARB 60 grants the request for encoding the thumbnail image data from the DMAC 63 to cause the JPEG encoder 32 to encode the thumbnail image data, and sends the encoded thumbnail image data to the DMAC 63. When performing the operation requested by the DMAC 63, the ARB 60 does not grant any other request. In this manner, a plurality of kinds of image data may be encoded by one JPEG encoder 32 while suppressing the processing speed even when a plurality of requests is received substantially at the same time.

In an example operation of sending the image data stored in the HDD 14 to the network, the ARB 60 may receive the request for encoding the output image data from the DMAC 64. The ARB 60 grants the request for encoding the output image data form the DMAC 64 when none of the requests is received from the DMACs 41 to 43 to cause the JPEG encoder 32 to encode the output image data, and sends the encoded output image data to the DMAC 64. During the operation of encoding the output image data, the ARB 60 does not grant any other request.

In an example operation of encoding the input image data generated by the scanner 10 and sending the encoded image data to the network, the ARB 60 may receive the request for encoding the original-size image data from the DMAC 61, the request for encoding the preview image data from the DMAC 62, the request for encoding the thumbnail image data from the DMAC 63, and the request for encoding the output image data from the DMAC 64, substantially at the same time. According to the order of priority, the ARB 60 sequentially grants the requests to cause the JPEG encoder 32 to process one request at a time.

The operation described above referring to FIGS. 2 and 3 may be performed in various other ways. For example, a JPEG encoder may be additionally provided in the image processor 17. When two JPEG encoders are provided, a first JPEG encoder encodes the original-size image data received from the original image processing circuit 33 and the output image data received from the output image processing circuit 38, while a second JPEG encoder encodes the preview image data received from the preview image processing circuit 34 and the thumbnail image data received from the thumbnail image processing circuit 35. In such case, a DMAC corresponding to the first JPEG encoder is capable of switching between the input from the DMAC 42 and the input from the DMAC 47 according to the order of priority. Another DMAC corresponding to the second JPEG encoder is capable of switching between the input from the DMAC 43 and the input from the DMAC 44 according to the order of priority.

In another example, JPEG encoding performed on any one of the preview image data and the thumbnail image data may be performed, using an encoding program. In such case, the CPU 20 applies encoding to any one of the preview image data and the thumbnail image data, which may be stored in the memory 15 after being generated by the image processor 17. In such case, the DMAC 41 may have a structure such that it switches between the input from the DMAC 42 and the input from the DMAC 47 according to the order of priority.

Further, the operation described above referring to FIGS. 2 and 3 generates three kinds of processed image data including the original-size image data, preview image data, and thumbnail image data. Alternatively, any number or any combination of processed image data may be generated from the input image, for example, according to the default setting or the user preference. For example, the image processor 17 may generate only the original-size image data. In another example, the image processor 17 may generate the original-size image data and the preview image data. In another example, the image processor 17 may generate the original-size image data and the thumbnail image data.

Referring now to FIGS. 2 and 4, operation of generating the print image data and the transferred data is explained according to an example embodiment of the present invention. In this example, the CPU 20 reads out the processed image data stored in the HDD 14, and sends the image processor 17 through the second PCIe I/F 31. The image processor 17 performs the following operation of generating one or more kinds of output image data, according to a user instruction.

Upon receiving a user instruction for printing the image data stored in the HDD 14, the CPU 20 reads out the encoded processed image data stored in the HDD 14 from the HDD 14, and sends the encoded processed image data to the image processor 17. In this example, the encoded processed image data may be the encoded original-size image data, generated by the original image processing circuit 33 and the encoder 32. The encoded processed image data is sent to the JPEG decoder 37 through the PCIe I/F 31, the ARB 50, and the DMAC 46 to be decoded by the JPEG decoder 37. The decoded processed image data is sent to the output image processing circuit 38 through the DMAC 46 and the DMAC 47. The output image processing circuit 38 applies color conversion to the decoded processed image data, which has the RGB format, to generate the image data having the CMYK format. The image data having the CMYK format, i.e., the print data, is sent to the CPU 20 through the DMAC 47, the ARB 50, and the PCIe I/F 31, and further to the memory 15 to be temporality stored. The CPU 20 reads out the print image data from the memory 15, and sends the print image data to the plotter 11 through the output controller 19.

Upon receiving a user instruction for transferring the image data stored in the HDD 14, the CPU 20 reads out the encoded processed image data stored in the HDD 14 from the HDD 14, and sends the encoded processed image data to the image processor 17. In this example, the encoded processed image data may be the encoded original-size image data, generated by the original image processing circuit 33 and the encoder 32. The encoded processed image data is sent to the JPEG decoder 37 through the PCIe I/F 31, the ARB 50, and the DMAC 46 to be decoded by the JPEG decoder 37. The decoded processed image data is sent to the output image processing circuit 38 through the DMAC 36 and the DMAC 47. The output image processing circuit 38 applies resolution conversion to the decoded processed image data to generate the transferred image data. The transferred image data is sent to the CPU 20 through the DMAC 47, the ARB 50, and the PCIe I/F 31, and further to the memory 15 to be temporarily stored. The CPU 20 reads out the transferred image data, and further sends it to the JPEG encoder 32 through the PCIe I/F 31, the ARB 50, and the DMAC 41. The JPEG encoder 32 encodes the transferred image data into the encoded transferred image data, and sends the encoded transferred image data to the CPU 20 thorough the DMAC 41, the ARB 50, and the PCIe I/F 31, and further to the memory 15 to be temporarily stored. The CPU 20 reads out the encoded transferred image data from the memory 15, and sends it to the communication controller 16 through the input/output controller 18. The encoded transferred image data is then sent to the network through the communication controller 16.

In this manner, the image processor 17 applies processing for output, such as JPEG decoding or encoding, to image data stored in the HDD 14 even when the user instruction for printing and the user instruction for transferring are received at substantially the same time. Further, the image processor 17 generates a plurality of kinds of output image data from the image data stored in the HDD 14 while suppressing the processing speed even when the user instruction for printing and the user instruction for transferring are received at substantially the same time.

Referring now to FIG. 4, an example structure of the DMAC 46, which controls inputting of image data to the JPEG decoder 37, is explained. The DMAC 46 includes an ARB 70, a DMAC 71, and a DMAC 72.

The DMAC 71 controls input of the image data to the JPEG decoder 37, by sending a request for decoding the image data to the ARB 70. When the ARB 70 determines to grant the request sent by the DMAC 71, the DMAC 71 outputs the image data read out from the memory 15 through the ARB 50 for printing, to the ARB 70. The ARB 70 inputs the image data to the JPEG decoder 37, and outputs the decoded image data to the DMAC 71. The DMAC 71 outputs the decoded image data to the output image processing circuit 38 through the DMAC 47 for further image processing.

Alternatively, the DMAC 71 may output the decoded image data to the memory 15. The decoded image data may be then read out from the output image processing circuit 38 for further image processing.

The DMAC 72 controls input of the image data to the JPEG decoder 37, by sending a request for decoding the image data to the ARB 70. When the ARB 70 determines to grant the request sent by the DMAC 72, the DMAC 72 outputs the image data read out from the memory 15 through the ARB 50 for transfer, to the ARB 70. The ARB 70 inputs the image data to the JPEG decoder 37, and outputs the decoded image data to the DMAC 72. The DMAC 72 outputs the decoded image data to the output image processing circuit 38 through the DMAC 71 and the DMAC 47.

Alternatively, the DMAC 72 may output the decoded image data to the memory 15 through the ARB 50. The decoded image data may be then read out from the output image processing circuit 38 for further image processing.

The ARB 70 manages the requests sent by the DMACs 71 and 72 such that only one request is granted at a time. When two requests are sent to the ARB 70 at substantially the same time, the ARB 70 determines to grant the requests sequentially in an order previously set. In this example, the order may correspond to the order of priority in using the JPEG decoder 37. Specifically, in this example, the ARB 70 grants the requests sequentially in the order of DMAC 71 and DMAC 72. The order of priority may be set before sending image data.

In an example operation of decoding the image data stored in the HDD 14 before preparing the image data for printing and transferring, the ARB 70 may receive the request from the DMAC 71 and the request from the DMAC 72 substantially at the same time. According to the order of priority, the ARB 70 first grants the request received from the DMAC 71 to cause the JPEG decoder 37 to decode the image data for printing, and sends the decoded image data to the ARB 50. The ARB 70 then grants the request received from the DMAC 72 to cause the JPEG decoder 37 to decode the image data for transfer, and sends the decoded image data to the ARB 50.

Figure 5:
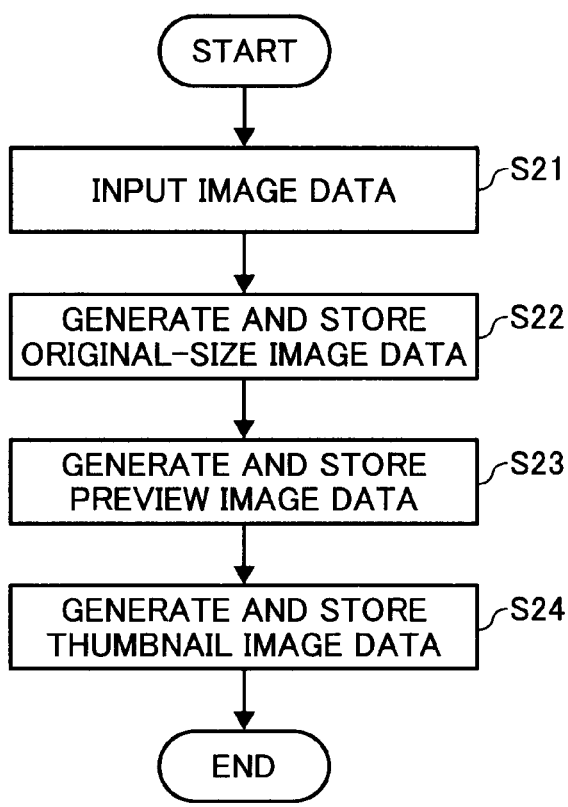
FIG. 5 is a flowchart illustrating operation of inputting image data to the multifunctional apparatus shown in FIG. 1 according to an example embodiment of the present invention.

Referring now to FIG. 5, operation of inputting image data, performed by the MFP 1, is explained according to an example embodiment of the present invention. The operation of FIG. 5 may be performed when the MFP 1 of FIG. 1 is requested to store a plurality of processed image data generated from input image data in the HDD 14.

S21 inputs image data as input image data, for example, by scanning.

S22 generates the original-size image data from the input image data, and stores the original-size image data. S22 may be performed by the original image processing circuit 33 as soon as the input image data becomes available.

S23 generates the preview image data from the input image data, and stores the preview image data. S23 may be performed by the preview image processing circuit 34 upon completion of S22.

S24 generates the thumbnail image data from the input image data, and stores the thumbnail image data, and the operation ends. S24 may be performed by the thumbnail image processing circuit 35 upon completion of S23.

Figure 6:
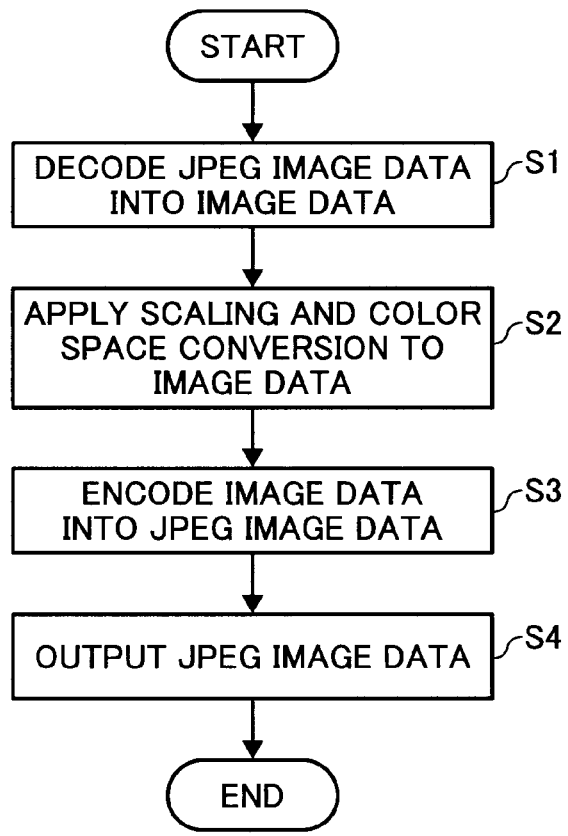
FIG. 6 is a flowchart illustrating operation of outputting image data stored in the multifunctional apparatus shown in FIG. 1 according to an example embodiment of the present invention.

Referring now to FIG. 6, operation of outputting image data stored in the HDD 14, performed by the MFP 1, is explained according to an example embodiment of the present invention. The operation of FIG. 6 may be performed when the MFP 1 of FIG. 1 is requested to send the image data to the network through the communication controller 16, or when the MFP 1 of FIG. 1 is requested to store the image data onto the recording medium through the medium drive 13.

S1 reads out the JPEG encoded image data, which is stored in the HDD 14, from the HDD 14 onto the memory 15. The encoded image data is sent to the JPEG decoder 37 of the image processor 17, one page by one page. The JPEG decoder 37 decodes the encoded image data into decoded image data.

S2 sends the decoded image data to the output image processing circuit 38 of the image processor 17 to apply image processing to the decoded image data according to an instruction received from the user. The user instruction may be input through the operation panel 12 or through an input device connected to the communication controller 16. For example, the output image processing circuit 38 may apply color space conversion to convert the decoded image data from the Adobe RGB format into the sRGB format. Further, the output image processing circuit 38 may apply resolution conversion. Alternatively, S2 may not be performed when the user instruction requests the MFP 1 to output the image data without applying image processing.

S3 sends the processed image data to the JPEG encoder 32 to encode the processed image data. At this time, subsampling may be applied to the processed image data such that the brightness component Y and the color difference components Cb and Cr of the preview image data have the ratio 4:2:2.

S4 outputs the encoded processed image data to the network through the communication controller 16 or to the recording medium through the medium drive 13, and the operation ends.

Referring now to FIG. 7, operation of outputting image data stored in the HDD 14, performed by the CPU 20 of the MFP 1, is explained according to an example embodiment of the present invention. The operation of FIG. 6 may be performed when the MFP 1 of FIG. 1 is requested to printing the image data using the plotter 11.

S11 reads out the JPEG encoded image data, which is stored in the HDD 14, from the HDD 14 onto the memory 15. The encoded image data is sent to the JPEG decoder 37 of the image processor 17, one page by one page. The JPEG decoder 37 decodes the encoded image data into decoded image data.

S12 sends the decoded image data to the output image processing circuit 38 of the image processor 17 to apply image processing to the decoded image data according to an instruction received from the user. The user instruction may be input through the operation panel 12 or through an input device connected to the communication controller 16. For example, the output image processing circuit 38 may apply color space conversion to convert the decoded image data from the Adobe RGB format into the CMYK format. Further, the output image processing circuit 38 may apply resolution conversion, and/or gradation processing.

S13 sends the processed image data to the plotter 11 to cause the plotter 11 to print the image data, and the operation ends.

As described above referring to FIG. 2, the operation of FIG. 6 and the operation of FIG. 7 may be performed in an order previously determined when the MFP 1 of FIG. 1 is requested to send the image data to the network through the communication controller 16 and to print the image data using the plotter 11, at substantially the same time.

Numerous additional modifications and variations are possible in light of the above teachings. It is therefore to be understood that within the scope of the appended claims, the disclosure of this patent specification may be practiced in ways other than those specifically described herein.

For example, elements and/or features of different illustrative embodiments may be combined with each other and/or substituted for each other within the scope of this disclosure and appended claims.

Further, the operation of the image processor 17 of FIG. 1 may be performed in synchronization with one or more synchronization signals, which may be generated by a timing circuit. Alternatively, the operation of the image processor 17 of FIG. 1 may be performed asynchronously.

Further, the number of arbiters provided in the image processor 17 may not be limited to the above-described example shown in FIGS. 2, 3, and 4.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc. Once the computer program is stored in an information processing apparatus, such as a general-purpose computer having a processor and a memory, the information processing apparatus may function as the image processor 17 of FIG. 1.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The invention claimed is:

1. An image processing apparatus, comprising:
    a scanner configured to scan an original into input image data;
    a memory configured to store image data generated from the input image data; and
    an image processor configured to apply image processing to the image data to generate a plurality of kinds of image data, wherein the image processor includes:
    a first input image processing circuit configured to apply first input image processing to the input image data to generate first processed image data, and to store encoded processed image data in the memory;
    a decoder configured to decode the encoded processed image data obtained from the memory into decoded image data;
    an output image processing circuit configured to apply output image processing to the decoded image data to generate output image data, and to output encoded output image data to be transferred through a network;
    an encoder configured to encode the first processed image data into the encoded processed image data, and the output image data into the encoded output image data;
    a first encoder memory controller coupled to the encoder and the first input image processing circuit and configured to output a first encoding request for requesting the encoder to encode the first processed image data;
    a second encoder memory controller coupled to the encoder and the output image processing circuit and configured to output a second encoding request for requesting the encoder to encode the output image data; and
    a first coordination circuit coupled to the first input image processing circuit, the output image processing circuit, the first encoder memory controller, the second encoder memory controller, and the encoder and configured to manage the first encoding request and the second encoding request to cause the encoder to encode the first processed image data and the output image data in an order previously determined when the first encoding request and the second encoding request are output substantially at the same time.

2. The image processing apparatus of claim 1, further comprising:
    a first output device configured to output the encoded output image data to an outside apparatus through the network; and
    a second output device configured to output print image data to an image forming device, the print image data being generated from the decoded image data obtained by the decoder.

3. The image processing apparatus of claim 2, wherein the image processor further includes:
    a first decoder memory controller coupled to the decoder and the output image processing circuit and configured to output a first decoding request for requesting the decoder to decode the processed image data to be output as the encoded output data through the network;
    a second decoder memory controller coupled to the decoder and the output image processing circuit and configured to output a second decoding request for requesting the decoder to decode the processed image data to be output as the print image data; and
    a second coordination circuit coupled to the first decoder memory controller, the second decoder memory controller, the output image processing circuit, and the decoder and configured to manage the first decoding request and the second decoding request to cause the decoder to decode the processed image data to be output as the encoded output data and the processed image data to be output as the print image data in an order previously determined when the first decoding request and the second decoding request are output substantially at the same time.

4. The image processing apparatus of claim 3, wherein the output image processing applied by the output image processing circuit includes at least one of color space conversion, scaling, resolution conversion, and gradation processing.

5. The image processing apparatus of claim 3, wherein the image processor further includes:
- a second input image processing circuit to apply second image processing to the input image data to generate second processed image data, wherein the encoder is further configured to encode the second processed image data to be stored in the memory; and
- a third encoder memory controller coupled to the second input image processing circuit and the encoder and configured to output a third encoding request for requesting the encoder to encode the second processed image data, wherein
- the first coordination circuit is further coupled to the second input image processing circuit and the third encoder memory controller and configured to further manage the third encoding request to cause the encoder to encode the first processed image data, the second processed image data, and the output image data in an order previously determined when at least two of the first encoding request, the second encoding request, and the third encoding request are output substantially at the same time.

6. An image processing method, comprising:
- scanning an original into input image data;
- applying first input image processing to the input image data to generate first processed image data;
- outputting a first encoding request for requesting an encoder to encode the first processed image data into encoded processed image data;
- encoding, using the encoder, the first processed image data into the encoded processed image data, the encoded processed image data being stored in a memory;
- decoding, using a decoder, the encoded processed image data obtained from the memory into decoded image data;
- applying output image processing to the decoded image data to generate output image data;
- outputting a second encoding request for requesting the encoder to encode the output image data into encoded output image data;
- encoding, using the encoder, the output image data into the encoded output image data, the encoded output image data being output through a network; and
- managing the first encoding request and the second encoding request to cause the encoder to encode the first processed image data and the output image data in an order previously determined when the first encoding request and the second encoding request are output substantially at the same time.

7. The image processing method of claim 6, further comprising:
- outputting the encoded output image data to an outside apparatus through the network; and
- outputting print image data to an image forming device, the print image data being generated from the decoded image data obtained by the decoder.

8. The image processing method of claim 7, further comprising:
- outputting a first decoding request for requesting the decoder to decode the processed image data to be output as the encoded output data through the network;
- outputting a second decoding request for requesting the decoder to decode the processed image data to be output as the print image data; and
- managing the first decoding request and the second decoding request to cause the decoder to decode the processed image data to be output as the encoded output data and the processed image data to be output as the print image data in an order previously determined when the first decoding request and the second decoding request are output substantially at the same time.

9. The image processing method of claim 8, further comprising:
- applying second image processing to the input image data to generate second processed image data;
- encoding, using the encoder, the second processed image data to be stored in the memory;
- outputting a third encoding request for requesting the encoder to encode the second processed image data; and
- managing the third encoding request to cause the encoder to encode the first processed image data, the second processed image data, and the output image data in an order previously determined when at least two of the first encoding request, the second encoding request, and the third encoding request are output substantially at the same time.

* * * * *